United States Patent [19]

Boeuf et al.

[11] 4,279,763

[45] * Jul. 21, 1981

[54] PROCESS OF PREPARING FERRITE POWDERS

[75] Inventors: Jean-Marie Boeuf, Grenoble; Pierre Gerest, Allevard; Henri Lemaire, LaTronche, all of France

[73] Assignee: Aimants Ugimag S.A., Saint-Pierre-d'Allevard, France

[*] Notice: The portion of the term of this patent subsequent to Sep. 5, 1997, has been disclaimed.

[21] Appl. No.: 156,655

[22] Filed: Jun. 5, 1980

Related U.S. Application Data

[63] Continuation-in-part of Ser. No. 138,532, Apr. 9, 1980, which is a continuation of Ser. No. 876,355, Feb. 9, 1978, abandoned.

[51] Int. Cl.$^3$ ............................................. C04B 35/26
[52] U.S. Cl. ............................... 252/62.58; 252/62.6; 252/62.63; 423/594
[58] Field of Search ................. 252/62.58, 62.6, 62.63; 423/594

[56] References Cited

U.S. PATENT DOCUMENTS

| 3,716,630 | 2/1973 | Shirk | 252/62.58 |
| 3,897,355 | 7/1975 | Arendt et al. | 252/62.58 |

FOREIGN PATENT DOCUMENTS

| 284335 | 4/1966 | Australia | 252/62.63 |
| 1955611 | 6/1970 | Fed. Rep. of Germany | 252/62.58 |
| 355103 | 9/1972 | U.S.S.R. | 252/62.58 |
| 367466 | 3/1973 | U.S.S.R. | 252/62.58 |

*Primary Examiner*—Jack Cooper
*Attorney, Agent, or Firm*—McDougall, Hersh & Scott

[57] ABSTRACT

The invention relates to a process for preparing ferrite powders of Ba, Sr, and/or Pb intended to be incorporated in an elastomeric, thermoplastic, or thermosettable binder for manufacturing flexible or rigid permanent magnets. The process comprises the preparation of a mixture of iron oxides and carbonates of Ba, Sr and/or Pb, adding to said mixture one or more alkaline earth halides in a total proportion of 0.5 to 15% of the total weight of the mixture, and one or more oxygenated boron compounds, more particularly, alkaline and/or alkaline earth borates, in a proportion of 0.2 to 7%, and calcining said mixture between 850° and 1100° C. for at least 15 minutes.

7 Claims, No Drawings

PROCESS OF PREPARING FERRITE POWDERS

This application is a continuation-in-part of copending application Ser. No. 138,532, filed on Apr. 9, 1980 which is a continuation of application Ser. No. 876,355, filed on Feb. 9, 1978, now abandoned.

The present invention relates to a process for preparing ferrite powders that are to be incorporated in a thermoplastic, thermosettable, or elastomeric binder, in order—after having been put into a form that permits the mechanical and/or magnetic orientation of the particles—to make permanent magnets, agglomerates or rigids, with high magnetic properties.

At present two techniques are being employed for preparing such powders. The older one consists of calcining a mixture of $\alpha$ $Fe_2O_3$ iron oxide and barium carbonate, strontium carbonate or a combination of these carbonates at a high temperature, between 1200° and 1300° C. When leaving the calcining furnace, the ferrite is in a highly sintered state due to the high temperature at which it was formed. Therefore, it must undergo elaborate crushing for the purpose of obtaining an approximate particle size of one micron. Then one must carry out a recovery treatment between 800° and 1100° C. in order to regenerate the magnetic properties that were partially destroyed in the course of the crushing. The ferrite powder is then ready for use.

The second, more recent technique consists of incorporating a flux into the mixture of iron oxides and carbonates, prior to calcining, so as to favor the formation of the ferrite at a low temperature. Alternatively, this flux can be introduced in a large amount so as to obtain molten glass by heating, such as is described, for instance, in French Pat. No. 2,048,413, where the added flux is boric oxide, $B_2O_3$, in a molar proportion of 26.5% of the total mixture. This technique results in a high market price due to the cost and great quantity of flux, and due to the necessity of having to eliminate it from the obtained powder.

In a further alternative, the flux—acting as a "mineralizer"—is introduced into the mixture in a small quantity, on the order of several percent. In this way, one can accomplish the formation of the ferrite below 1100° C., even at 1000° C., and it is then no longer advantageous to carry out the crushing. Thus, simple crumbling, followed by an acidic wash and rinsing will suffice to make the powder ready for use.

In British Pat. No. 1,022,969, various reaction temperature reducing salts are indicated, for example, halides, particularly fluorides, or chromates or borates for lowering the calcining temperature when making sintered ferrite magnets. Although the thusly obtained powders have not been previously tested in composite magnets, they can be incorporated in an elastomer and after calendering which makes it possible to obtain a preferential orientation of the ferrite particles, products are obtained whose magnetic properties, expressed in specific energy (BH) max, range from 1 to 1.4 G Oe times $10^6$.

French Pat. No. 2,104,252 described the use of a mixture of NaF+PbO as the mineralizer. But in order to obtain satisfactory magnetic properties, it is necessary to start out with a particular acicular iron oxide, $\alpha$ $Fe_2O_3$, with a large specific surface area ($>20$ m$^2$/g) which constitutes an expensive raw material. Moreover, the use of lead oxide is rather risky, because of its high toxicity.

French Pat. No. 2,104,251 proposes to add either a mixture of $Bi_2O_3+NaF$, or barium chloride, $BaCl_2$. One obtains satisfactory magnetic properties, but the described procedures reveal serious drawbacks when they are transposed to the industrial stage. Thus, $Bi_2O_3$ has the same drawback as PbO, because it is rather extremely toxic.

In this system, the calcining temperature is rather high, greater than 1000° C., and the calcined product is crumbled only with difficulty. In order to obtain the indicated magnetic properties, one is obliged to use a crushing operation which makes it necessary to recover the calcined powder, therefore constituting an additional operation. Furthermore, where the $BaCl_2$ is employed, hydrochloric acid is formed in the course of calcining which may cause partial destruction of the ferrite.

The present invention proposes to remedy these drawbacks. It makes it possible to obtain ferrite powders that can be incorporated in a thermoplastic, or a thermosettable, or an elastomeric binder so as to make permanent magnets, agglomerates or rigids, that have excellent magnetic properties, and may even reach a specific energy BH max of $1.8^{106}$ G Oe, while using, for preparing the mixture:

common iron oxides of various origins including $Fe_2O_3$, FeO and $Fe_3O_4$ (natural, synthetic, or recovered oxides), or mixtures of these oxides, non-toxic additives without resorting either to subsequent crushing or to recovery of the calcined powders, and all under good economic conditions.

The invention more particularly concerns a process of preparing ferrite powders of Ba, Sr, and/or Pb that are intended to be incorporated in a thermoplastic, thermosettable, or elastomeric binder in order to obtain permanent magnets, flexible agglomerates or rigids, with excellent magnetic properties after they have been put in a form that allows the mechanical and/or magnetic orientation of the ferrite particles. The process consists of starting out with a mixture of iron oxide and a carbonate of Ba, Sr, and/or Pb, adding to said mixture one or more alkaline and/or alkaline earth halides in a total proportion of 0.5 to 15% (and preferably 1 to 10%) of the total weight of the mixture, and one or more oxygenated boron compounds, particularly alkaline or alkaline earth borates in proportions of 0.2 to 7% (and preferably 0.5 to 3%) of the total weight of the mixture, and calcining said mixture between 850° and 1100° C. (and preferably 900° to 1000° C.) for at least 15 minutes.

The powdered proportion of halide present in the mixture is preferably utilized in amounts between 2 and 5 times by weight the proportion of the oxygenated boron compound in the mixture.

In fact, applicants have found surprisingly that the association of these two kinds of mineralizers has a rather pronounced synergetic effect, in other words, the powders made in accordance with the invention make it possible to achieve for agglomerated magnets magnetic properties that are considerably superior to those that would be obtained if each mineralizer were used separately. The conjunction of these two mineralizers lead to independent single domain one-micron-size particles, having a high shape anisotropy ratio particularly useful for mechanical orientation.

Otherwise, the introduction of slight amounts of boron and fluor in the lattice of oxygens can be useful for hindering the appearance of defects when calendering, these defects playing a major role in the reversal of the magnetization.

The magnetic powdered material prepared by the process according to the invention, presents a distribution curve relating the intrinsic coercivity of the individual grains to their fraction volume which can be controlled in order to keep, after being incorporated in a binder and calendering, lower than 15% of the amount of the grains having an intrinsic coercivity lower than 300 Oersteds or lower than 30% of the amount of the grains having a coercivity lower than 2500 Oersteds. Under these conditions, the permanent magnets always show an intrinsic coercivity higher than 2400 Oersteds.

The halide that is preferably used is sodium fluoride. The borate that is preferably used is hydrated sodium tetraborate $B_4O_7Na_2$, 10 $H_2O$ which appears as an impalpable powder with a very large specific surface. Good results are obtained when the proportion by weight of the sodium fluoride in the original mixture is 2 to 5 times approximately the ponderal proportion of tetraborate and, more particularly, when one has from 0.5 to 3% of $B_4O_7Na_2$, 10 $H_2O$, and 3 to 10% of NaF.

The iron oxides used may be of a very varying nature which makes it possible to supply them under the optimum prevailing economic conditions. They may be natural oxides, synthetic oxides, oxides obtained from the recovery of ironworking products ("expickling" oxides) for instance by the high temperature cracking of a solution of iron chloride, iron hydroxides, or a mixture of these different oxides or hydroxides. These oxides are crushed until they have a specific surface area greater than 5 $m^2/g$. One can, moreover, be satisfied with even smaller specific surfaces if one is interested only in the magnetic properties of residual magnetism.

The oxides and carbonates can be mixed in the form of powders, in a solid and liquid medium. Preferably, the carbonate is barium carbonate and the molar ratio $n = (Fe_2O_3/BaCO_3)$ lies between 4.6 and 6.2. The mineralizer can be introduced into the mixture either dry or wet. The oxide-carbonate-borate-halide mixture is then calcined between 900° and 1000° C. in a circulating hot air furnace for a period ranging from 15 minutes to several hours, depending on the original material. Thereupon the obtained product is crumbled, washed, for example with hydrochloric acid diluted to 5%, and the whole is then brought to a boil for 15 minutes. It is then rinsed until a practically neutral pH is obtained, and is then dried. The powder is incorporated in an elastomeric, thermoplastic, or thermosettable matrix which serves as a binder; an internal mixer being employed. The powder-binder mixture then is subjected to a shaping operation by calendering, extrusion, injection, or compression which imparts a mechanical orientation to the ferrite particles and gives the product the desired shape. If necessary, this operation may be carried out in the presence of a magnetic field that enhances the magnetic properties even more.

The invention will be illustrated by examples based on experiments made by the applicant under the following operating conditions:

a mixture of iron oxide, barium carbonate, and halide is accomplished with rapid dry mixing;

an addition of borate dissolved in water is made. A sludge is obtained which is mixed carefully before drying and crumbling;

calcining is achieved in a furnace for 1 hour at 950° C., followed by crumbling;

washing is undertaken in a 5% HCl solution brought to boiling for 15 minutes;

successive rinsing operations follow for 15 minutes in boiling water;

drying of the powder is accomplished in an oven at 150° C.; and, rubber is introduced in a ratio of 90% of powder for 10% of rubber by weight followed by calendering.

The contents of the various constituents are expressed in percent of the total weight of the original mixture. The magnetic properties obtained for the flexible magnet are expressed in the following units:

remanent saturation induction—Br is Gauss coercive field—Hc in Oersteds intrinsic coercivity—iHc in Oersteds specific energy—(BH) max in Gauss Oersteds $\times 10^6$.

EXAMPLE 1

The example compares the results obtained from introducing boron only (A), fluoride only (B), and a mixture of borate and fluoride (C).

TABLE I

|  |  | A | B | C |
|---|---|---|---|---|
| Starting mixture | $\alpha Fe_2O_3$ | 80.7 | 77.0 | 75.8 |
|  | $BaCO_3$ | 17.8 | 17.0 | 16.7 |
|  | NaF | — | 6.0 | 6.0 |
|  | $B_4O_7Na_2$ | 1.5 | — | 1.5 |
| Results | Br | 2520 | 2460 | 2650 |
|  | Hc | 2220 | 2250 | 2370 |
|  | iHc | 3800 | 4400 | 3200 |
|  | BHmax | 1.50 | 1.43 | 1.77 |

One notices the marked synergetic effect of the fluoride + borate addition compared to the addition of the one or the other of the mineralizers. This effect is clear in terms of the remanent induction as well as on the coercive field, and is manifested above all on the specific energy.

EXAMPLES 2 to 9

In the course of another series of experiments, the NaF content and the $Ba_4O_7Na_2$ content were varied simultaneously. The results are shown in Table II.

EXAMPLES 10 to 12

A chloride (NaCl) and an iodide (KI) were substituted for the NaF, and calcium diborate was substituted for the sodium tetraborate. The results are given in Table III.

TABLE II

| Example No. | 2 | 3 | 4 | 5 | 6 | 7 | 8 | 9 |
|---|---|---|---|---|---|---|---|---|
| $Fe_2O_3$ | 78.2 | 77.8 | 77.4 | 77.0 | 76.6 | 76.2 | 75.8 | 75.4 |
| $BaCO_3$ | 17.3 | 17.2 | 17.1 | 17.0 | 16.9 | 16.8 | 16.7 | 16.6 |
| NaF | 4.0 | 4.0 | 4.0 | 4.0 | 6.0 | 6.0 | 6.0 | 6.0 |
| $B_4O_7Na$ | 0.5 | 1.0 | 1.5 | 2.0 | 0.5 | 1.0 | 1.5 | 2.0 |
| Br | 2550 | 2630 | 2500 | 2480 | 2580 | 2650 | 2690 | 2670 |
| Hc | 2300 | 2350 | 2080 | 2090 | 2360 | 2420 | 2410 | 2340 |
| IHc | 3400 | 300 | 3700 | 3700 | 3500 | 3650 | 3000 | 3250 |
| (BH)max | 1.55 | 1.68 | 1.44 | 1.43 | 1.60 | 1.70 | 1.75 | 1.71 |

TABLE III

| Example No. | 10 | 11 | | 12 | |
|---|---|---|---|---|---|
| $Fe_2O_3$ | 76.2 | 79.5 | | 77.8 | |
| $BaCO_3$ | 16.8 | 17.5 | | 17.2 | |
| NaF | 6.0 | | KI 1.5 | | NaCl 4.0 |
| $Ca(BO_2)_2$ | 1.0 | $B_4O_7Na$ | 1.5 | $B_4O_7Na_2$ | 1.0 |
| Br | 2610 | 2630 | | 2660 | |

TABLE III-continued

| Example No. | 10 | 11 | 12 |
|---|---|---|---|
| Hc | 2370 | 2230 | 2390 |
| iHc | 3530 | 3110 | 3420 |
| (BH)max | 1.65 | 1.64 | 1.71 |

In the foregoing examples, the iron oxides employed comprise "expickling" $Fe_2O_3$ obtained by the Ruthner process. The following examples illustrate the fact that no particular form of iron oxide is critical to the invention.

EXAMPLE 13

Natural crushed iron oxide with a specific area of 5.5 m2/g was utilized along with 16.7% of barium carbonate, 6% NaF and 1.5% of sodium tetraborate.
Magnetic properties:
Br = 2 620 gauss
Hc = 2 500 Oe
iHc = 4 340 Oe
BHmax = 1.68 M G-Oe

EXAMPLE 14

As Example 13, but with ex-pickling iron oxide (Lurgi process), crushed to a specific area of 2.3 m2/g and calcined at 1050° C. for 30 min.
Magnetic properties:
Br = 2 610 gauss
Hc = 2 290 Oe
iHc = 3 160 Oe
BHmax = 1.64 M G-Oe

EXAMPLE 15

As Example 13 but with ex-pickling iron oxide (Lurgi process) washed but non-crushed, having a specific area of 6.2 m2/g and calcinated at 1000° C. for 30 min.
Magnetic properties:
Br = 2 580 gauss
Hc = 2 330 Oe
iHc = 2 940 Oe
BHmax = 1.62 M G-Oe

EXAMPLES 16-18

As Example 13 but with a mixture of 50% by weight ex-pickling non-crushed iron oxide (Lurgi process) with a specific area of 6.2 m2/g and 50% by weight crushed ex-pickling iron oxide (Lurgi process) with a specific area of 5.5 m2/g along with 6% NaF calcinated at 1000° C. for 30 min. together with:

|  | Magnetic Properties |
|---|---|
| 1.2% $B_4O_7Na_2$, 10 $H_2O$ | Br = 2 600 gauss |
|  | Hc = 2 360 Oe |
|  | iHc = 3 360 Oe |
|  | BHmax = 1.62 M GOe |
| or 1% $B_2O_3$ | Br = 2 600 gauss |
|  | Hc = 2 360 Oe |
|  | iHc = 3 450 Oe |
|  | BHmax = 1.62 M G—Oe |
| or 1% $BO_3H_2$ | Br = 2 600 gauss |
|  | Hc = 2 390 Oe |
|  | iHc = 3 530 Oe |
|  | BHmax = 1.62 M G—Oe |

EXAMPLE 19

A mixture of 50% by weight ex-pickling non-crushed iron oxide (Lurgi process) with a specific area of 6.2 m2/g and 50% by weight crushed ex-pickling iron oxide (Lurgi process) with a specific area of 5.5 m2/g, 6% NaF, 1.2% of anhydrous $B_2O_4Na_2$ and 16.7% of barium carbonate, are calcined at 1000° C. for 30 min. The final magnetic properties are:
Br: 2610 gauss
Hc: 2350 Oe
iHc: 3360 Oe
BHmax: 1.62 MG-Oe Examples 16-19 illustrate that a variety of oxygenated boron compounds, both hydrated and anhydrous, are usable in combination with a halide to achieve the results of the invention.

As will be apparent from the foregoing, applicants have described a process for preparing ferrite powders of Ba, Sr or Pb that are to be incorporated in an elastomeric, thermoplastic, or thermosettable binder for the purpose of obtaining flexible or rigid permanent magnets with high magnetic properties. The process comprises the steps of preparing a mixture of particles of iron oxide of various types along with at least one carbonate of Ba, Sr or Pb followed by calcining of the mixture to produce a Ba, Sr or Pb ferrite powder adapted for incorporation in the binder and for orientation in the binder.

The particular improvement in the process comprises the steps of adding to the mixture at least one alkaline or alkaline-earth halide in a total amount of 0.5% to 15% of the total weight of said mixture, and also adding at least one oxygenated boron compound in a total amount of 0.2 to 7% of the weight of said mixture. The calcining of the mixture between 850° and 1100° for at least 15 minutes follows, and the mixture is then crumbled and acid washed, water rinsed and dried. The powder obtained comprises single domain, approximately one micron size particles suitable for direct incorporation and orientation in a binder. The magnets obtained upon incorporation and orientation of said powder in the binder are characterized by higher Br, Hc and BHmax properties than magnets obtained utilizing powder prepared by the above process but having only one of said halide and oxygenated boron compound additives.

In the preferred form of the invention, the halide is selected from the group consisting of sodium fluoride, sodium chloride, and potassium iodide while the oxygenated boron compound is selected from the group consisting of $B_2O_4Na_2 \cdot nH_2O$, $B_4O_7Na_2 \cdot nH_2O$, and $Ca(BO_2)_2$, and wherein n equals from 0 to 10.

It will be understood that various changes and modifications may be made in the procedures described without departing from the spirit of the invention particularly as described in the following claims:

That which is claimed is:

1. In a process for preparing ferrite powders of Ba, Sr or Pb that are to be incorporated in an elastomeric, thermoplastic, or thermosettable binder for the purpose of obtaining flexible or rigid permanent magnets with high magnetic properties, the process comprising the steps of preparing a mixture of particles of iron oxide and at least one carbonate of Ba, Sr or Pb, calcining the mixture to produce Ba, Sr or Pb ferrite powder, the powder being then adapted for incorporation in said binder and for orientation in the binder, the improvement in said process comprising the steps of adding to said mixture at least one alkaline or alkaline-earth halide in a total amount of 0.5% to 15% of the total weight of said mixture, and at least one oxygenated boron compound in a total amount of 0.2 to 7% of the weight of said mixture, thereafter calcining the mixture between 850° and 1100° for at least 15 minutes, crumbling the calcined mixture, and acid washing, water rinsing and drying the mixture, the powder obtained comprising single domain, approximately one micron size particles suitable for direct incorporation and orientation in said binder, the magnets obtained upon incorporation and orientation of said powder in said binder being characterized by higher Br, Hc and BHmax properties than magnets obtained utilizing powder prepared by the above process but having only one of said halide and oxygenated boron compound additives.

2. A process in accordance with claim 1 wherein said halide is selected from the group consisting of sodium fluoride, sodium chloride, and potassium iodide.

3. A process in accordance with claims 1 or 2 wherein said oxygenated boron compound is selected from the group consisting of $B_2O_4Na_2 \cdot nH_2O$, $B_4O_7Na_2 \cdot nH_2O$, and $Ca(BO_2)_2$, and wherein n equals from 0 to 10.

4. A process as claimed in claim 1 wherein the halide is present in a total amount of 1-10% by weight of the total mixture.

5. A process according to claim 1 wherein the oxygenated boron compound is present in an amount between 0.5% to 3% of the total weight of the mixture.

6. A process according to claim 1 wherein the halide is in powdered form and wherein the powdered proportion of halide in the mixture is between 2 and 5 times by weight the proportion of the oxygenated boron compound.

7. A process according to claim 1 wherein the oxygenated boron compound is introduced in the dissolved state in water.

* * * * *